M. LEITCH.
CUPOLA.
APPLICATION FILED APR. 4, 1910. RENEWED MAY 7, 1913.
1,065,454.
Patented June 24, 1913.
3 SHEETS—SHEET 1.
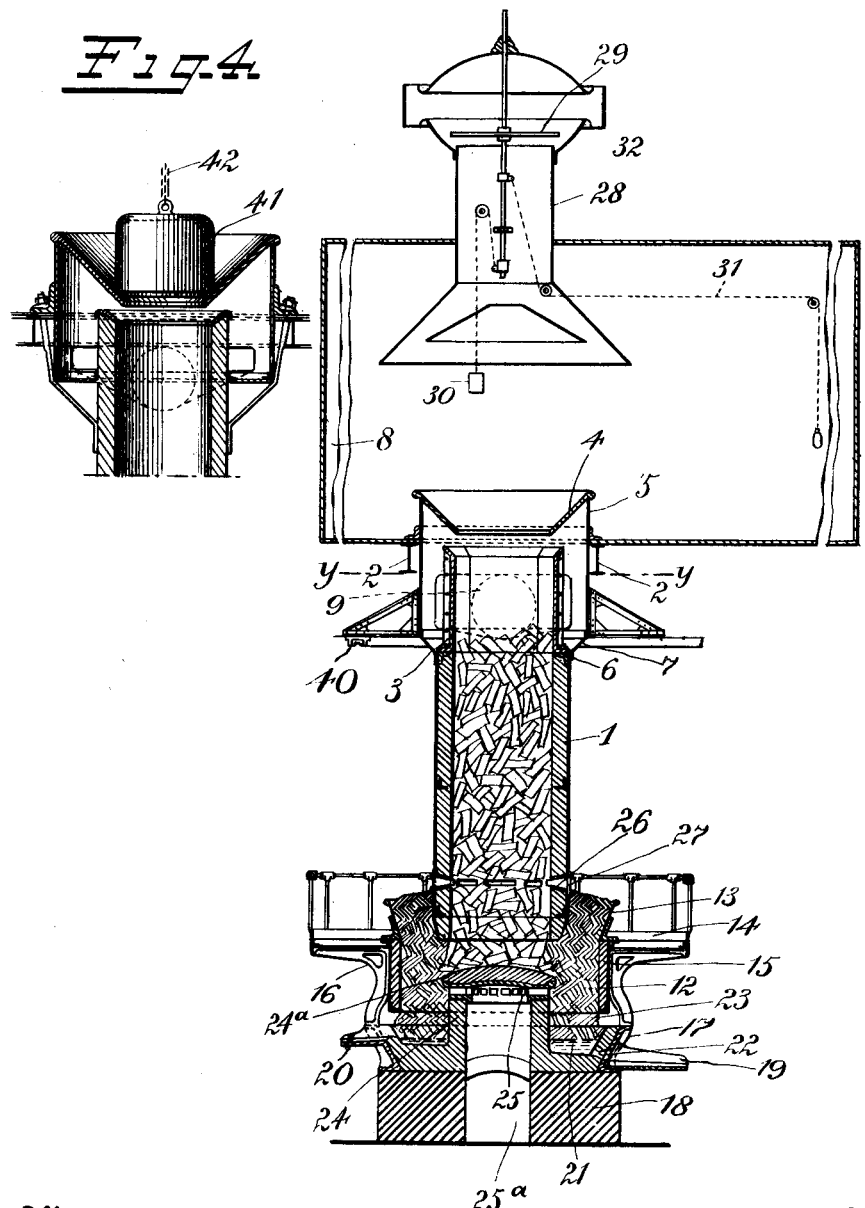
Witnesses:
Inventor
MEREDITH LEITCH

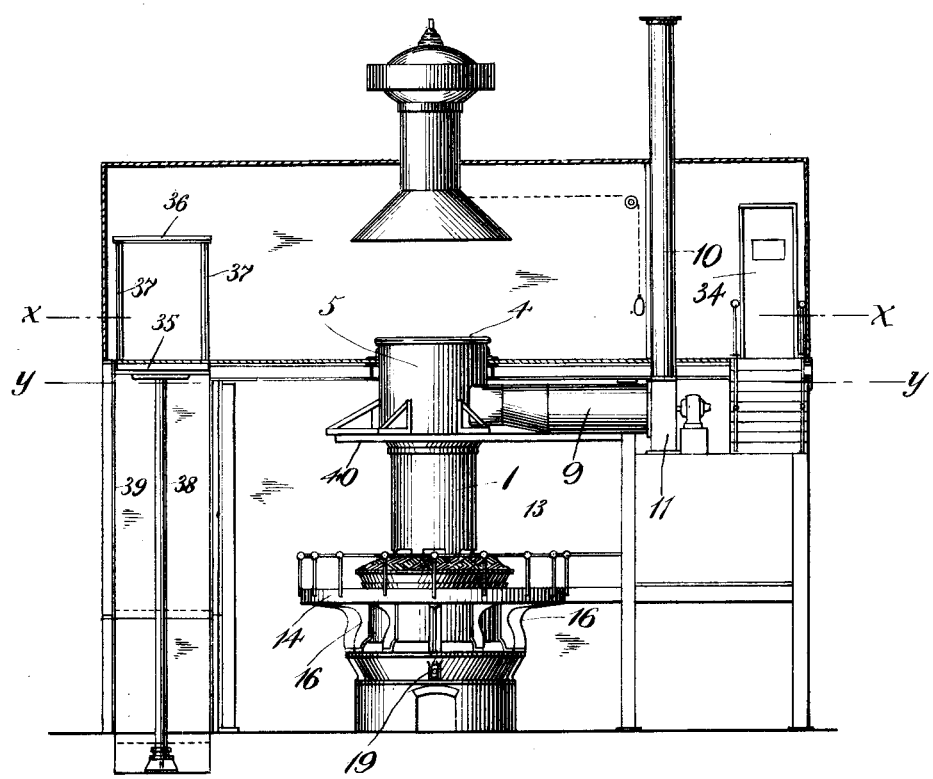

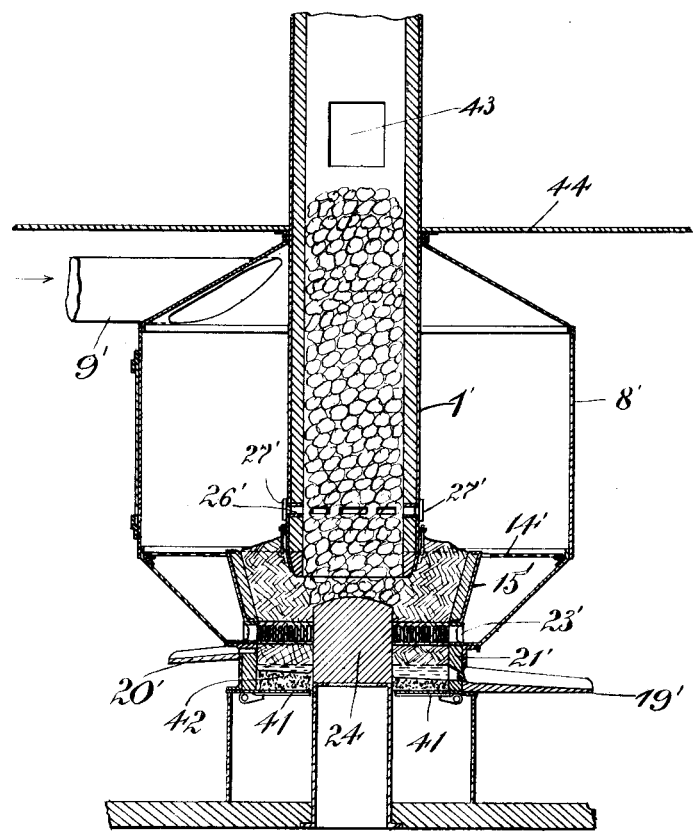

UNITED STATES PATENT OFFICE.

MEREDITH LEITCH, OF SPRINGFIELD, MASSACHUSETTS.

CUPOLA.

1,065,454.  Specification of Letters Patent.  Patented June 24, 1913.

Application filed April 4, 1910, Serial No. 553,285. Renewed May 7, 1913. Serial No. 766,205.

*To all whom it may concern:*

Be it known that I, MEREDITH LEITCH, a citizen of the United States, residing at Springfield, county of Hampden, State of Massachusetts, have invented certain new and useful Improvements in Cupolas, of which the following is a full, clear, and exact description.

My invention relates to improvements in cupolas for melting metals, and has for its object to produce a new and improved cupola in which the fuel charge is not mixed with the metal charge, but in which the metal when melted passes through the burning fuel.

It further has for its object to produce a cupola in which substantially no wasteful decomposition of the fuel will occur, and in which the iron will be sufficiently superheated for foundry purposes.

It further has for its object to produce a cupola in which the gases discharged at the upper end of the cupola are relatively cool, the heat having been absorbed by the iron charge.

It further has for its object to produce a cupola in which the draft is in the preferred form largely produced by reduced pressure at the upper end of the cupola.

It further has for its object in its preferred form to provide a cupola with an induced draft and in which the draft is not interrupted during the charging of the cupola with either iron or fuel.

It further has for its object to produce a cupola whose operation may be continuous or intermittent, as desired, without dropping the bottom.

It further has for its object to produce a cupola in which the labor for charging the fuel and the iron is located at different points, so as not to interfere.

It further has for its object to produce a cupola having a center twyer for admitting air to the interior of the body of fuel.

It further has for its object to produce a cupola in which the decomposition of the fuel is confined to a region near the lower part of the stack.

It further has for its object to produce a cupola in which if it is desired not to perfectly decompose the fuel at the entrance to the lower part of the stack, a perfect decomposition may be effected within the iron charge without any detrimental effect.

The following is a description of an embodiment of my invention, reference being had to the accompanying drawings, in which, Figure 1 shows a vertical section of the cupola in its preferred form; Fig. 2 shows a cupola with its accessories the accessories being partly in section; Fig. 3 shows a plan view of the upper portion of the cupola with its accessories in section, partially on the line $x$—$x$ Fig. 2 and partially on the line $y$—$y$ Fig. 2; Fig. 4 shows a modification of the upper portion of the cupola stack of Fig. 1, in which modifications the charging platform is not tightly inclosed; Fig. 5 shows a modification, in which the draft is caused by pressure, as distinguished from suction.

Referring more particularly to the drawings, 1 is the stack, supported in any suitable manner. In the present form it is suspended from near its upper end upon I-beams 2—2, the weight being transmitted to said I-beams by intermediate portions. To gain space for the purposes hereinafter described, the upper portion 3 of the stack is made of cast iron. Above the portion 3 is located a charging hopper 4, whose outer periphery rests on and partially closes the top of a drum 5, forming a small suction chamber, whose lower end is connected to the stack at 6 by an intermediate portion.

8 is a substantially air tight man-chamber inclosing the hopper 4 and large enough for one or more attendants to handle and feed iron in the form of pigs or otherwise.

9 is a duct communicating with the drum 5 and leading to means for creating a reduced pressure within the drum 5 and the chamber 8. Such means may be a stack 10, assisted, if necessary, by a power driven fan 11. At the bottom of the stack is a fuel chamber 12 having a hopper 13 entirely surrounding the stack. Below the mouth of this hopper and surrounding the same is a charging platform 14, for the attendant whose duty it is to supply fuel.

15 is the outside wall of the fuel chamber, supported by a plurality of brackets 16, which brackets rest on the rim of the iron reservoir jacket 17 carried by foundations 18. The iron reservoir jacket is provided with a discharge spout 19 for the molten iron and a discharge spout 20 for the molten slag. The slag spout is situated at a higher level than the iron spout, so that the iron may be accumulated in the iron reservoir without running out of the slag spout.

21 is the iron reservoir whose walls are made of refractory material, having a perforation 22 leading to the spout 19. Between the upper edge of the iron reservoir and the bottom of the wall 15 is a continuous twyer 23 for the entrance of air to the fuel within the chamber 12. This twyer also provides for the cleaning of the furnace when such cleaning is necessary.

Below the stack I provide a support for the material within the stack such that there will be an opening for molten metal to flow through from the stack and thence through the fuel which lies below it. As this support I preferably provide what I term a "stump" 24, being a short upwardly projecting column whose upper end 24ᵃ is preferably slightly larger than the internal diameter of the stack 1. This support or stump may be provided with circumferential twyers 25 for admitting air from the duct 25ᵃ to the interior of the mass of the fuel. The passage of the air through the stump increases the supply of oxygen to the fuel and also serves to cool the stump so as to protect it against the intense heat to which it is subjected.

For some purposes it is desirable to be able to admit air at a point above the discharge exit of the stack, and for that purpose I provide a series of supplemental twyers 26, provided with dampers 27, so that the supplemental twyers can be opened and closed as desired.

In connection with the iron charging chamber, I provide a ventilator 28 having a valve 29 which is over-counterbalanced by a weight 30. To the valve is connected a cord 31, by which the valve may be pulled downward to its seat 32. When the pressure within the chamber 8 is reduced and the valve 29 is pulled to its seat, it is maintained there by that pressure. When the pressure becomes normal, the weight 30 opens the valve so that the chamber 8 is ventilated, the gases from the cupola being in this way carried to the external atmosphere.

In order to permit entrance and exit to the charging chamber 8, I provide outwardly opening air locking doors 33—34, one of which holds the pressure when the other is open.

In order to enable iron to be conveniently introduced within the chamber 8 without reducing the pressure therein, I provide an elevator platform 35 having a secondary platform 36 carried by suitable supports 37.

38 is a piston rod for elevating and depressing the elevator.

39 is a tight inclosure surrounding the elevator shaft and extending from the floor of the chamber 8 to the bottom surface of the platform 36 when the elevator is in its depressed position.

The platforms 35 and 36 fit the shaft 39, being provided with packing, if necessary, so as to prevent too great leakage of air. It will be noted that either the platform 35 or the platform 36 is always within the tightly inclosed portion of the elevator shaft, thereby preventing such substantial air leakage at all times. The metal can thus be loaded onto the elevator when it is in depressed position and introduced into the air chamber 8 without interfering materially with the low pressure within that chamber. The slight leakage which necessarily occurs in the chamber 8 is sufficient to supply the men within the chamber with fresh air and to keep the chamber sufficiently cool to enable them to work.

For the convenience of handling the fuel, I provide trolley tracks 40, on which travel depending fuel carriers.

In the modification shown in Fig. 4, the inclosed charging chamber 8 of Fig. 1 is dispensed with, and in order to maintain the low pressure within the drum 5, a plug 41 is provided, together with means 42 for lifting it during charging and lowering it after the charge has been introduced.

In Fig. 5 I show a cupola in which both the inclosed charging chamber and the plug are dispensed with, and in which the necessary draft is caused by pressure, as distinguished from suction. In this form I use a wind box, enlarging the same so as to enable a man to work within the same. Referring to Fig. 5, 1' is the stack. 15' is the outer wall of the fuel chamber, which rests on a metal casting 23' forming a series of twyers. This metal casting rests upon the outer wall of the iron reservoir 21'. 19' is the spout for the molten iron and 20' is the spout for the slag. 24 is the stump beneath the stack. 26' are the supplemental twyers above the fuel. 27' are dampers for the twyers 26'. Surrounding the stack is an air tight chamber 8', which at its upper end joins the stack and at its lower end forms a tight joint below the twyers 23'. This box is supplied through a duct 9' with air under pressure, corresponding to the blast pipe used in ordinary cupola practice. 14' is a platform inside of the wind box 8' for the attendant who has charge of supplying fuel to the fuel chamber. This platform is in the form of a grating, permitting the air to pass downward through it to the twyers 23'. An air-locked opening (not shown) to the wind box is provided for the purpose of entrance and exit, and for the introduction of fuel. In this form the bottom of the iron reservoir is closed by means of two hinged doors 41, which when the furnace is in use, is covered by a layer 42 of loose refractory material. By this means the bottom of the furnace may be dropped down at the end of a heat and the contents discharged, if desired. Such doors are necessary where the main twyers are not of sufficient size to enable the furnace to be cleaned out otherwise. 43 is a charging opening in the upper portion of the stack, and 44 is a charging floor for handling the iron charge.

The operation of the cupola is as follows: If pig iron is to be treated, the stack is first filled with pig iron. A fire is then built in the fuel chamber, the fuel used in starting being preferably coke, an artificial draft being created by suitable means, as described. The upper portion of the fuel chamber may be filled with bituminous coal and after the operation of the cupola is started the fuel added may all be in the form of bituminous coal. As the fire burns, the volatile substances in the bituminous coal are driven off and the coal is converted into coke in the fuel chamber itself. As the fuel burns, the products of combustion pass upward through the stack, coming in contact with the pig iron in the lower portion of the stack. Inasmuch as there is no fuel in the stack, the carbon dioxid ($CO_2$) produced by the burning of the coal is not reduced to carbon monoxid (CO), as is the case in cupolas now usually employed, but passes upward through the stack, losing its heat by reason of its contact with the relatively cool pig iron, until when it reaches the upper end of the stack it is comparatively cool. These cool gases then pass out. In case the combustion is not complete when the gases first enter the stack, additional air may be admitted into the stack through the supplemental twyers 26, so that complete combustion takes place before the gases reach the portion of the iron in the upper end of the stack, thus leaving the upper end of the charge in a state of substantially perfect combustion. The major portion of the air which combines with the fuel enters through the twyers 23, although some may come down from the surface of the coal. The heat of the fuel within the fuel chamber heats the iron between the stump 24 and the lower end of the stack to a melting temperature, whereupon the molten iron flows off the stump and downward through the burning fuel. In flowing through this burning fuel it becomes superheated, so that when it reaches the iron reservoir 21 it is sufficiently superheated and fluid for foundry purposes. It can be drawn off in the ordinary manner through the spout 19, or it may run continuously as it is formed. The drawing of the iron should be done with due regard to the slag which is formed, the slag being discharged at the slag spout 20 in the ordinary manner, that is, iron must be drawn off rapidly enough so as not to permit it to discharge through the slag spout 20, and if the molten iron is not being formed as fast as it is drawn off, the aperture 22 must be closed so as to permit the iron to accumulate in such a manner as to prevent the slag from flowing out of the orifice 22. As the iron accumulates, it lifts the slag, causing it to run out of the spout 20. The operation is a continuous one, pig iron being fed in to the top of the stack hopper as fast as needed, and fuel being supplied to the fuel hopper as fast as needed. The artificial draft is caused by suitable means. In Figs. 1 to 4, the stack 10 (supplemented by the fan 11, if necessary) and the inclosed chamber 8, into which iron is introduced by the elevator 35, as described, secures such draft. Additional air is supplied to the fuel through the twyers 25 in the stump, if desired. In the device shown in Fig. 4, the action is the same, with the exception that the artificial draft is interrupted during the time that the charge is being placed in the stack. In the form shown in Fig. 5, similar results are produced, the artificial draft in this case, however, being the result of air pressure in excess of atmospheric pressure at the twyers 25' and 26'. The difference in pressure between the twyers and the top of the stack depends upon the closeness of the iron fuel charges and the rate at which it is desired to melt the iron, as will be well understood by those skilled in the art.

In some cases, for metallurgical reasons, it may be desirable not to have the fuel perfectly consumed as it comes in contact with the iron. In these cases, the mass of fuel and the supply of air through the twyers 23 (and 26 if used) should be so proportioned that the amount of air supplied will not contain a sufficient amount of oxygen for the perfect combustion of the gases as they pass through the latter part of the fuel. In this case, the gases, when they come in contact with the unmelted iron, will carry some carbon monoxid (CO) and will act upon the iron at the mouth of the cupola in this form. In order not to lose the heat energy of the gases thus composed, I can then open the supplemental twyers 26, permitting oxygen to enter, so that complete combustion will be brought about at this point, thus preventing the loss of the heat units of the partially consumed gases and utilizing them for the partial heating of the iron in advance of its arriving at the melting point. The gases, as they pass through the upper body of the charge, are, as before stated, cooled down so as to be comparatively cool, and after complete combustion has once taken place there is no further formation of carbon monoxid in the stack, because of the absence of fuel in the portion of the stack subsequently traversed. Not only are the heat units of the fuel thus made very effective, but the gases are cooled so as to not interfere with the charging of the furnace or with the use of any mechanical devices for producing an induced draft, in case such mechanical devices may be desirable.

In constructing the cupolas the portions exposed to an intense heat are, in accordance with ordinary practice, made of highly refractory material suitably protected against heat, if necessary, by well known expedients.

If during the operation of the cupola it becomes necessary to clean the lower portion of the fuel chamber, this may be effected through the twyers 23 of Fig. 1. Where the twyers are not available for this purpose, as, for instance where twyers with small openings are used, such as in Fig. 5, the doors 41 may be dropped at the end of the heat and the fuel chamber cleaned out.

In case it is desired to temporarily interrupt the operation of the cupola, leaving the same charged with iron, I introduce into the stack at the proper time a layer of coke two or three feet thick, after which I continue the charging of the stack with pig iron. During the descent of this coke I shut off the supplemental twyers 26 in case the same are open. When the coke has descended through the stack so as to rest upon the stump, I then discontinue the artificial draft and bank the fire. The arrival of the layer of coke at the stump will be indicated by the cessation of the flow of iron. By using this layer I melt off all the iron on the stump and replace the same with coke, and at the same time prevent the iron above the layer of coke from becoming so heated as to melt and subsequently congeal into an obstruction which will interfere with the subsequent starting of the cupola. The layer of coke referred to, as it passes down and as it reaches the stump, acts to reduce the heat within the stack by converting the carbon dioxid ($CO_2$) into carbon monoxid ($CO$), thus rendering the heat latent. The carbon monoxid which is thus formed passes off in the form of gas, but is formed only during a brief interval and does not materially interfere with the operation and does not materially affect the average economy of the cupola. For cleaning out the cupola entirely a charge of limestone would be fed in to the stack in the ordinary manner.

The bituminous coal at the surface of the fuel hopper is packed down so as to prevent the entrance of any considerable amount of air at that point, forcing the air to come through the twyers 23, where it is particularly effective. A sufficient amount of air, however, passes through the bituminous coal and mingles with the volatile matter which is distilled therefrom, to carry the gases down to the mouth of the stack, and aids its combustion when it reaches the proper temperature. The use of bituminous coal is a great advantage, since it has the highest thermal value to the pound, and also, as compared with coke, it does not carry as high a percentage of water, which, when coke is used, has to be driven off at a loss before ignition takes place.

My invention permits of embodiment in various modified forms other than those which I have shown, as will be evident to those skilled in the art.

What I claim is:

1. In a cupola, the combination of a stack, a support beneath said stack for the material therein, a fuel chamber for solid fuel having an independent feed opening and having a connection with the interior of said stack, said connection constituting an outlet for the metal in said stack when molten, said fuel chamber extending from above the lower end of said stack to below the upper surface of said support so that molten metal flowing from said stack will pass downward through a mass of burning fuel in said fuel chamber, an outlet for the molten metal situated below said fuel chamber, and means for causing a draft of air through said feed opening and fuel chamber and into said stack.

2. In a cupola, the combination of a stack, a support beneath said stack for the material therein, a fuel chamber for solid fuel having an independent feed opening and surrounding said stack and said support and having a connection with the interior of said stack on a plurality of sides thereof, said connection constituting an outlet for the metal in said stack when molten, said fuel chamber extending from above the lower end of said stack to below the upper surface of said support so that molten metal flowing from said stack will pass downward through a mass of burning fuel in said fuel chamber, an outlet for the molten metal below said fuel chamber, and means for causing a draft of air through said feed opening and fuel chamber and into the lower end of said stack.

3. In a cupola, the combination of a stack, a projecting stump supported from beneath and in turn supporting the material within said stack, a fuel chamber for solid fuel having an independent feed opening and surrounding said stump and the lower part of said stack and extending below the upper end of said stump so that molten metal flowing from said stack will pass downward through a mass of burning fuel in said fuel chamber, an outlet for the molten metal below said fuel chamber, and means for causing a draft of air through said feed opening and fuel chamber and into the lower end of said stack.

4. In a cupola, the combination of a stack, a support beneath said stack for the material therein, a fuel chamber for solid fuel having an independent feed opening and having a connection with the interior of said stack, said connection constituting an outlet for the iron in said stack when molten, said fuel chamber extending from above the lower end of said stack to below the upper surface of said support so that molten metal flowing from said stack will pass downward through a mass of burning fuel in said fuel chamber, an outlet for the molten metal situated below said fuel chamber, a slag outlet above the outlet for the molten metal, and means for causing a draft of air through said feed opening and fuel chamber and into said stack.

5. In a cupola, the combination of a stack, a support beneath said stack for the material therein, a fuel chamber having an independent feed opening and a connection with the interior of said stack, said connection constituting an outlet for the iron in said stack when molten, said chamber extending from above the lower end of said stack to below the upper surface of said support so that molten metal flowing from said stack will pass downward through burning fuel in said fuel chamber, an outlet for the molten metal situated below said fuel chamber, means for causing a draft through said fuel chamber and into said stack, and twyers located at the base of said fuel chamber and above said outlet.

6. In a cupola, the combination of a stack, a projecting stump supported from beneath and in turn supporting the material within said stack, a fuel chamber having an independent feed opening and surrounding said stump and the lower part of said stack and extending below the upper end of said stump so that molten metal flowing from said stack will pass downward through burning fuel in said fuel chamber, an outlet for the molten metal below said fuel chamber, means for causing a draft through said fuel chamber and into the lower end of said stack, twyers located at the base of said fuel chamber and above said outlet, and twyers in said stump.

7. In a cupola, the combination of a stack, a support beneath said stack for the material therein, a fuel chamber having an independent feed opening and a connection with the interior of said stack, said connection constituting an outlet for the metal in said stack when molten, said fuel chamber extending from above the lower end of said stack to below the upper surface of said support so that molten metal flowing from said stack will pass downward through burning fuel in said fuel chamber, an outlet for the molten metal situated below said fuel chamber, means for causing a draft through said fuel chamber and into said stack, twyers located at the base of said fuel chamber and above said outlet, and twyers located in said stack above said fuel chamber.

8. In a cupola, the combination of a stack, a support beneath said stack for the material therein, a fuel chamber having an independent feed opening and a connection with the interior of said stack, said connection constituting an outlet for the metal in said stack when molten, said fuel chamber extending from above the lower end of said stack to below the upper surface of said support so that molten metal flowing from said stack will pass downward through burning fuel in said fuel chamber, an outlet for the molten metal situated below said fuel chamber, a chamber connecting with the upper end of said stack, and means for maintaining within said chamber a reduced pressure and causing a draft through said stack and fuel chamber.

9. In a cupola, the combination of a stack, a support beneath said stack for the material therein, a fuel chamber having an independent feed opening and surrounding said stack and said support and having a connection with the interior of said stack on a plurality of sides thereof, said connection constituting an outlet for the metal in said stack, when molten, said fuel chamber extending from above the lower end of said stack to below the upper surface of said support so that molten metal flowing from said stack will pass downward through burning fuel in said fuel chamber, an outlet for the molten metal below said fuel chamber, a man-chamber connecting with the upper end of said stack and means for maintaining within said chamber a reduced pressure, and causing a draft through said stack and fuel chamber.

10. In a cupola, the combination of a stack, a support beneath said stack for the material therein, a fuel chamber having an independent feed opening and a connection with the interior of said stack, said connection constituting an outlet for the metal in said stack when molten, said fuel chamber extending from above the lower end of said stack to below the upper surface of said support so that molten metal flowing from said stack will pass downward through burning fuel in said fuel chamber, an outlet for the molten metal situated below said fuel chamber, a drum surrounding the upper end of said stack, a hopper partially closing the upper end of said drum and discharging into said stack, and means for maintaining a reduced pressure in said drum and causing a draft through said stack and fuel chamber.

11. In a cupola, the combination of a stack, a support beneath said stack for the material therein, a fuel chamber having an independent feed opening and a connection with the interior of said stack, said connection constituting an outlet for the metal in said stack when molten, said fuel chamber extending from above the lower end of said stack to below the upper surface of said support so that molten metal flowing from said stack will pass downward through burning fuel in said fuel chamber, an outlet for the molten metal situated below said fuel chamber, a drum surrounding the upper end of said stack, a hopper partially closing said drum and discharging into said stack, and a substantially tight man-chamber inclosing said hopper, and means for maintaining a reduced pressure in said man-chamber and a draft through said stack and fuel chamber.

12. In a cupola, the combination of a stack, a support beneath said stack for the material therein, a fuel chamber having an independent feed opening and a connection with the interior of said stack, said connection constituting an outlet for the metal in said stack when molten, said fuel chamber extending from above the lower end of said stack to below the upper surface of said support so that molten metal flowing from said stack will pass downward through burning fuel in said fuel chamber, an outlet for the molten metal situated below said fuel chamber, a drum surrounding the upper end of said stack, a hopper partially closing said drum and discharging into said stack, a substantially tight man-chamber inclosing said hopper, an air-locked elevator communicating with said man-chamber, and means for maintaining a reduced pressure within said man-chamber and a draft through said stack and fuel chamber.

13. In a cupola, the combination of a stack, a support beneath said stack for the material therein, a fuel chamber having an independent feed opening and a connection with the interior of said stack, said connection constituting an outlet for the metal in said stack when molten, said fuel chamber extending from above the lower end of said stack to below the upper surface of said support so that molten metal flowing from said stack will pass downward through burning fuel in said fuel chamber, an outlet for the molten metal situated below said fuel chamber, a drum surrounding the upper end of said stack, a hopper partially closing said drum and discharging into said stack, a substantially tight man-chamber inclosing said hopper, an outwardly opening over-counterbalanced ventilating valve connecting said man-chamber with the outer air and means for maintaining a reduced pressure within said man-chamber and a draft through said stack and fuel chamber.

MEREDITH LEITCH.

Witnesses:
C. W. WEBB,
FREDERICK K. FEARNSIDE.